United States Patent
Hall

[11] 3,757,738
[45] Sept. 11, 1973

[54] ANIMAL COMMODE
[76] Inventor: John Oliver Hall, 4210 Centre Ave., Pittsburgh, Pa. 15213
[22] Filed: Aug. 1, 1972
[21] Appl. No.: 276,916

[52] U.S. Cl. ........................................ 119/1, 4/239
[51] Int. Cl. ........................................... A01k 29/00
[58] Field of Search .................... 119/1; 4/235, 237, 4/239, 243

[56] References Cited
UNITED STATES PATENTS
| | | | |
|---|---|---|---|
| 2,820,969 | 1/1958 | Wedge | 4/239 |
| 2,839,764 | 6/1958 | Gardner | 4/237 |
| 2,053,594 | 9/1936 | Albert | 119/1 |

*Primary Examiner*—Robert Peshock
*Assistant Examiner*—J. N. Eskovitz
*Attorney*—Harry John Staas, James D. Halsey, Jr. et al.

[57] ABSTRACT

An animal commode combined with a conventional human toilet facility, featuring a hinged or otherwise operatively mounted animal seat having walls sloping downwardly intersecting near the center of the bowl, at least one perforation provided in the seat in the vicinity of the intersecting walls, a cup located on the underside of the seat rearwardly of the perforation, a cup-like rim on the upperside of the seat next to the flush tank, a cover operatively mounted to the seat to move between a first position alongside the bowl when the animal seat rests upon the human set during use by animals and a second position closing the bottom of the animal seat when same is raised to rest against the flush tank when the human seat is in use.

7 Claims, 6 Drawing Figures

PATENTED SEP 11 1973   3,757,738
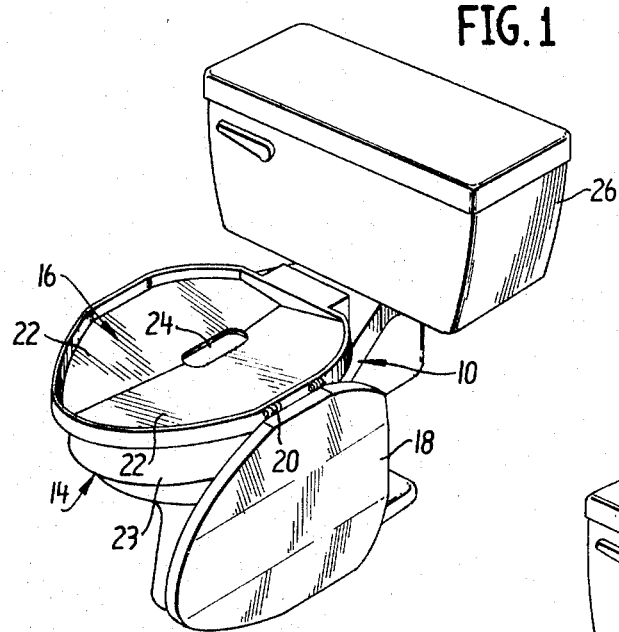
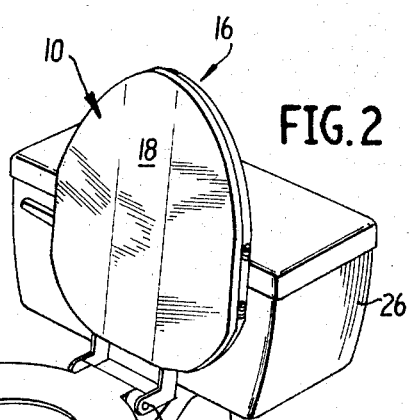
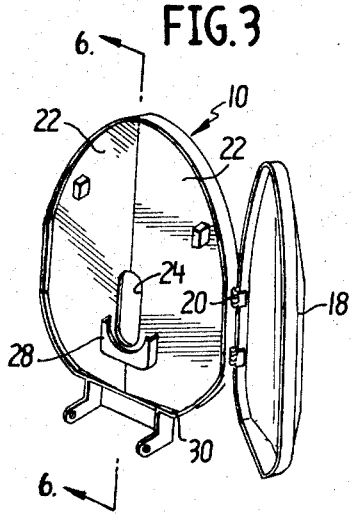
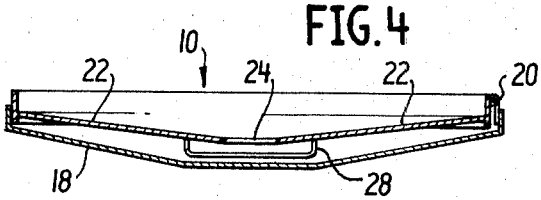
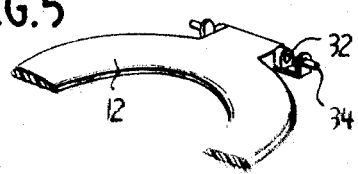
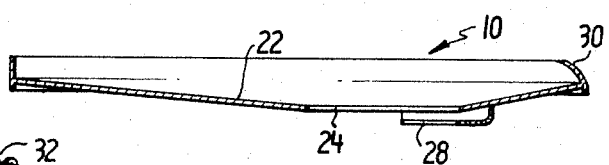

ANIMAL COMMODE

BACKGROUND OF THE INVENTION

The general purpose of this invention is to provide an animal commode for use indoors, primarily by cats and dogs, in combination with a conventional human toilet. The commode of the present invention offers many advantages over prior art devices, including (1) ease in training animals to use; (2) accessibility to the animals at nearly all times, including periods of human absence; (3) low cost; (4) reduced odor; (5) ease of cleaning and maintanance; (6) minimum interference to utilization of the facility by humans; (7) reduced demand and scheduling of human time to attend to the animal's needs; and (8) an improved environment through better disposal.

Among larger household pets, dogs and cats constitute the greatest number and thereby occasion the greatest problems in sanitation. When animals are mentioned herein, reference is primarily to dogs and cats. It has been estimated that there are about 26,000,000 dogs and 21,000,000 cats in the United States, and that the pet census increases about 3 percent annually. Most of these animals relieve themsleves out of doors, on lawns, flowers, shrubbery, parklands, streets, and sidewalks, thereby creating unsanitary conditions greatly annoying and inconveniencing millions of humans, who are consequently limited in their own enjoyment of these amenities.

The inadequacy to date of solutions to the problem of disposing of animal excrement is well demonstrated by the fact that the practice of animals relieving themselves anywhere they please outdoors has not substantially changed in the many years animals have been associated with man. This situation was tolerable in a world of few people widely dispersed. In recent decades, however, the human population has not only increased greatly, but has tended to congregate in dense urban areas. Despite the increased population density, and the reduced amount of land per human, the population of dogs and cats has increased correspondingly with man, or even more rapidly. Animals now compete intensively with humans for use of the ever-more-limited urban space.

Furthermore, the character of housing in urban areas has changed and is continuing to change from freestanding houses surrounded by garden space to apartments with little or no attached ground. The occupants of apartment dwellings, therefore, must release their pets to foul the public ways, parklands, and nearby private property where grass may yet be found. Obviously, it is apparent that something needs to be done to improve animal sanitation.

At the same time, circumstances for humans are not improving in the urban areas in terms of pet-care convenience. With the proportion of the population in the United States living in apartments steadily increasing, a larger number of persons each day face the frequently inconvenient requirement of walking a dog on the public streets until it relieves itself.

Large numbers of cats, meantime, have been provided alternative, albeit unsatisfactory, facilities indoors. Although many cats, when living arrangements make it possible, are permitted outside the home to relieve themselves, others now use a pan containing absorbent material. This method, although representing an improvement of recent years, is unsatisfactory in several respects, including expense, odor, and frequent cleanup. There is a growing need for a better solution for cats and their owners, in order that man and animal may continue their association with mutual satisfaction and benefit.

The state of the art with respect to animal sanitation is still primitive and has not kept up with the technological and social changes of man. There have been three major technological changes in history for the disposal of human wastes: (1) burying in ground or dumping into bodies of water; (2) water-borne sewage systems discharging into bodies of water, a development of the 19th century; and (3) sewage treatment before final discharge, a development of the 20th century still imperfectly implemented. There has been no comparable advance for pet animals. Their wastes, like wild animals, mostly continue to be deposited on the surface of the ground. It seems that even the inherited trait of animals to cover up their own feces by shoving dirt over it with their paws has become vestigial. In self-defense man is now attempting personally to clean up after animals, a new role, or at least a much more intensive effort, thrust on him by the increasingly unsatisfactory conditions. Then, to rid himself of the collected excement, he includes it with other solid wastes for ultimate disposal in land fills, incinerators, or at sea, or throws it into the sewage system via a toilet.

It is apparent that pet animals have not been provided the means by which they may directly, through their own volition, utilize the new technological systems of waste disposal developed for urban societies. The effect of this has been to place the traditional man-animal relationship under a growing strain. Increasingly, man finds himself burdened with animal cares not historically his lot. To pet owners the time consumption, inconvenience, and unpleasantness of dealing with mature animals as if they were infants, because they are not provided with adequate means for self-care, are becoming more and more onerous. To the public the effects of the existing situation, not of the animals' own choosing, are becoming less and less tolerable. Clearly, man needs to make it possible for animals themselves to utilize technological advances in waste disposal. There is no reason to believe that the adaptability of pet animals is unequal to the task — it is man who has failed to date by not providing the means.

Dogs, although more numerous than cats in the United States, are in a less favorable sanitary position than cats. Not a single device for disposal of dog urine and feces is in general use by even a small fraction of the population. For lack of other methods, dogs confined in homes urinate and defecate on the floor (usually of the room in which they are penned for that purpose), hopefully on newspapers which have been placed over the floor. Even when newspapers have been placed on the floor, urine tends to run under them or soak through, so that even a daily replacement does not save the floor itself from becoming impregnated with urine and its odor.

In view of the totally unsatisfactory condition for dogs indoors, their owners, whenever possible, turn them out in yards and streets, often unattended, or walk them in the streets and parks, where they tend to defecate anywhere they please, except for the relatively infrequent owners who successfully lead their dogs to a gutter for the act. Some few dogs are trained to go to the gutter.

Cats are equipped by nature to be less of a sanitary problem than dogs. They are more fastidious about cleanliness. Given favorable circumstances, unfortunately usually lacking, they will sometimes cover their excreta with dirt or sand. Inside the house, however, they pose a problem similar to that of dogs — where will they defecate and urinate?

For many years an indoor sand box was often provided for cats. The problems resulting from these devices are amply illustrated in the patents awarded over many years to inventors who sought a better solution. The sand would tend to stay wet with urine, ultimately becoming coated with urine and feces and increasingly odoriferous. Inventions have attempted to aleviate these conditions in several ways, especially through means for letting the urine run through the sand to a pan beneath, and by providing for screening the sand while retaining the excrement for disposal.

These inventions, never popular, were generally outmoded by the development in recent years of a substitute for sand, being absorbent granules which soak up the urine while having a deodorant effect, and also serving to some extent in drying the feces. Periodically the owner rakes through the pan containing this material, commonly referred to as "litter," collecting and discarding the feces thereby recovered. The litter itself is generally discarded and replaced every few weeks when its absorptive capacity and deodorizing influence are nearly exhausted.

The pans of litter have the continuing disadvantage of requiring the owner to collect and discard the excrement, and to replace the litter. They emit an odor despite the absorptive quality of the litter, which odor grows in intensity with each visit of a cat. They are also expensive to maintain, the litter alone costing from $120 to $240 over a 10-year life of a cat, depending upon the degree of sanitation and odor-level tolerated by the owner and his cat (a cat refuses to use a neglected litter pan).

In exceptional cases, cats have been taught to sit on a toilet seat, dropping excreta into a toilet bowl. One company offers a training aid for that purpose. The proportion of such trained cats is very small. The training is difficult and the method has the accompanying disadvantage of often leaving traces of urine and feces on the toilet seat, from which it must be cleaned before human use. In other exceptional cases, cats use a bathtub, with the urine running into the trap and experiencing some dilution and the feces remaining in the tub until removed by the owner and thrown into a nearby toilet. The bathtub must then be scrubbed before human use. Neither of these methods are widely used and contain features and problems which do not encourage their widespread adoption.

In general, therefore, current methods for disposing of feline excreta are merely tolerated for lack of better ones. They would be quickly and gratefully abandoned for improved methods.

Most previously patented devices deal with sand or litter pans for cats and thus have little or no relevance to the present invention. U.S. Pat. No. 1,813,329, however, proposes a permanent animal toilet facility to be installed in the floor of a house as one would install current bathroom fixtures. It is obviously complicated and expensive and apparently has never been exploited commercially. U.S. Pat. No. 2,053,594 discloses an animal commode placed on a toilet bowl.

SUMMARY OF THE INVENTION

The present invention is an animal commode which fits above a toilet bowl in a manner permitting both animal and human use of the toilet facility without mutual interference. When ready for use, the animal commode rests horizontally on the seat of the toilet, hinged thereto or otherwise operatively mounted in place of the usual seat cover, with one or more perforations therein positioned directly above the bowl and through which an animal's urine and feces may pass into the water below. When a toilet is needed for human use, the animal commode is lifted and placed in a reclining position against the flush tank as would an ordinary seat cover, after which its own hinged cover is closed against the exposed underside screening the animal commode from view. The toilet seat, which was already in place, may then be used by a human without coming into contact with the animal commode or any traces of animal wastes.

BRIEF DESCRIPTION OF THE DRAWINGS

FIG. 1 is a perspective view illustrating the animal commode of the present invention combined with a conventional toilet facility and in position for use by an animal;

FIG. 2 is a perspective view illustrating the animal commode in raised position permitting use of the toilet facility by a human;

FIG. 3 is a perspective view of the animal commode in raised position with its cover in open position illustrating the sloping sidewalls of the animal commode, the central perforation and the small cup directly below the perforation into which small amounts of urine or moisture pass during times in which the animal commode is not being used;

FIG. 4 is a cross-sectional view of the animal commode with its cover in closed position further illustrating the construction of the animal commode;

FIG. 5 is a perspective view illustrating a portion of the seat of the conventional toilet facility and one type of hinge assembly to which the animal commode may be mounted; and FIG. 6 is a cross-sectional view of the seat of the animal commode taken along line 6—6 of FIG. 3.

DESCRIPTION OF THE PREFERRED EMBODIMENT

The animal commode of the present invention is designated generally by the reference numeral 10 and rests on and above the seat 12 of the conventional toilet facility 14 to become an integral part thereof. In FIG. 1, the animal commode 10 is in position for use by an animal while in FIG. 2 the animal commode 10 is raised to its vertical position of non-use at which time the toilet facility 14 is available for use by humans.

The animal commode 10 consists of a seat 16 and a cover 18 secured thereto by hinges 20. The sidewalls 22 of the seat 16 slope downwardly, as illustrated in FIGS. 1 and 4. At the intersection of the sloping sidewalls 22 is located a perforation 24. The sloping sidewalls 22 permit urine and cleansing water to drain into the bowl 23 of the toilet facility 14. More than one perforation 24 may be used tand the size thereof varied. At least one of the perforations 24 must be large enough for feces to pass through easily. The width of the perforation 24 may be as little as one inch for cats and small dogs to two inches or even larger for larger dogs. Moreover, the size of the perforation 24 may be increased by the purchaser to suit the training requirements of a particular animal.

The seat 12 of the toilet facility 14 is usually 15 inches wide with its top surface about 15 ¼ to 16 ½ inches from the floor. Therefore, the width of the animal commode 10 will usually be, except for very large animals, that of the toilet seat 12 plus only a fraction of an inch in order to permit the cover 18, attached by hinges 20, to hang perpendicularly from one side without reaching the floor. Either side may be used for hinging the cover 18 according to the convenience indicated by a given bathroom layout. When vary large animals of, say, 60 pounds or So necessitate a greater width in the animal commode 10, part of the cover 18 may be hinged from each side, so that together they serve to conceal the animal commode 10 when raised to its storage position against the flush tank 26. Alternatively, a single cover could be hinged in the middle to provide a folding cover. The length of the animal commode 10 may vary from that of the toilet seat 12, about 17–19 inches for smaller animals, to perhaps twice that distance for very large animals.

The shape of the animal commode 10 may be varied from that shown in the drawings. Also, for bathrooms with layouts which would make inconvenient or impossible a length much beyond the front of the toilet bowl 23, the animal commode 10 may be constructed at a 90° angle, more or less, from that shown in the figures, using either the "double-door" or "folding-door" arrangement to cover the animal commode 10 in its raised position. In this case, as in all variations, the perforation 24, remains over the opening in the toilet seat 12 so that animal wastes may be deposited directly into the toilet bowl 23. Again, stability is obtained by having the animal commode 10 hinged firmly or otherwise operatively mounted to the toilet bowl 23.

As illustrated in FIGS. 3 and 4, a small cup 28 is located adjacent the perforation 24 such that when the animal commode 10 is raised to its storage position of FIG. 2 any small amount of urine or moisture that might have remained on the underside of the animal commode 10 will flow into the cup 28. When the animal commode 10 is subsequently lowered, this urine or moisture will empty into the toilet bowl 23. The small rim 30 at the back of the seat 16 serves the same purpose for any moisture on the upper surface, or floor, of the animal commode 10. Therefore, animal urine is not permitted to soil the toilet seat 12, the rim of the toilet bowl 23, or the area around the hinges 32 of the toilet seat 12. Any urine which fails to flow into the bowl 23 remains on the animal commode 10 only.

This animal commode 10 may be constructed to be directly assembled with the toilet seat 12, as illustrated in FIG. 2, in which case the animal commode is mounted directly to the existing hinge 32, or made to fit a separate hinge 34, as shown in FIG. 5. Even when supplied with the separate hinge 34, the arrangement works best if the seat cover of the toilet facility 14 is removed. The hinge 34 illustrated in FIG. 5 may be bolted to the toilet bowl 23 beneath the existing hinge 32. A less satisfactory means of bolting the hinge 34 would be by using bolts connecting the flush tank 26 and the toilet bowl 23. Another less satisfactory alternative would be to use the bolts of the existing hinge 32, but on the underside of the flange of the bowl 23.

The animal commode 10 may be permanently hinged when installed on the toilet or designed to be removed at will, perhaps by disengaging when at a given angle from horizontal or through use of a fastener. American Standard, Inc. manufactures a hinge called "Pop-Pins," which permits customers to change covers easily. The hinge of the animal commode 10 may be made to substitute for that of a seat cover on the product, greatly simpligying customer installation, as well as permitting ready removal for cleaning and simple reassembly. Another similar product of American Standard, Inc. is "Top-Loc," to facilitate installation and removal of seats, which also might be adapted to the animal commode.

The operation of the animal commode 10 will now be described. The concept of the animal commode is to enable an animal to share at will a modern sanitary convenience, the flush toilet, with humans, thereby obtaining the advantages of this technological advance for easy and inoffensive disposal of excreta, without in any way inconveniencing humans in their own use of the toilet. The animal commode does not allow a human to come in contact with animal wastes in his own normal use of the toilet.

After installation each animal is trained to use the animal commode. Placing a cat immediately on the animal commode upon bringing it home for the first time, especially if a sample of its urine is also placed in the animal commode, suffices for learning in most instances. If not, this process may be repeated, usually once or twice, until a cat learns its duty. Toilet training is quite easy for the cat family. For a cat the animal commode is very similar in size to a litter pan, but is more shallow and is placed above floor level. For a ketten, some intermediate step, such as a stool or ramp, may be needed temporarily to enable it to reach the animal commode. For the first few days of use the floor of the animal commode may be sprinkled with litter, appealing thereby to the natural tendency of cats to seek sand, soft dirt, leaves, etc., as the place to defecate. If the cat is already accustomed to a litter pan, the presence of litter also will facilitate adaptation to the animal commode. During the first few days a cardboard may be placed over the perforation 24 in the bottom of the animal commode 10 if desired to prevent excessive loss of the litter as well as to accustom the animal to the animal commode before disclosing the large perforation 24. Or, the animal commode 10 may be manufactured to permit the owner to enlarge the perforation 24 for feces on a gradual basis as the animal becomes adapted to the animal commode.

Dogs require more repetition. After each "accident," a dog needs to be spoken to in a reproving voice and placed immediately in the animal commode. No litter is required, but specimens of its urine may be sprinkled on the bottom of the animal commode until the dog is trained. A scent is also available on the market for this same purpose. During training the bathroom may be utilized whenever the dog is to be penned in a room, thereby facilitating use of the animal commode. The agility of a dog in reaching the animal commode is usually even less than that of a cat. Therefore, a small stool or box next to the toilet may be needed initially so that a dog may easily reach the animal commode.

Dogs of all sizes, including those of, say, 60 pounds, may be readily accommodated by the animal commode 10, the size being varied according to the weight of the dog.

Male dogs trained while puppies will continue to use the puppy position when urinating in the animal commode 10, even though employing the raised-leg position out of doors. An older male dog may require training for adaptation to the animal commode, although it is common for grown male dogs to continue to use the puppy position when in an open field lacking trees or other elevated objects.

The preferred position for an animal on the animal commode 10 is that of facing the front of the toilet, straddling the center line of the animal commode and the large perforation 24 leading to the water in the bowl 23 with its hind legs. For urination, however, it is of little consequence in which direction an animal faces, since the bottom of the animal commode 10 is designed to avoid or minimize the wetting of the animal's feet with urine. A position over the large perforation 24 is preferable for defecation in order that feces will be immediately immersed in water, thereby reducing odor and keeping the floor of the animal commode cleaner. However, even if deposited on the animal commode, the feces may be dropped or pushed through the perforation 24 into the water of the bowl 23 beneath. This may be done whenever the owner enters the bathroom and discovers the need. Therefore, this animal commode of the present invention does not require a highly trained animal for it to be fully useful. As long as the animal is taught to enter the animal commode this suffices for satisfactory use. No significant problems of animal adaptation are presented.

For humans the sharing of a toilet equipped with this animal commode is simple. It is only necessary to raise the animal commode 10, rest it against the flush tank 26, and close the cover 18, thereby concealing it and preventing contact therewith. The toilet seat 12 is ready for use, since it is never soiled by an animal. If an animal has previously used the toilet, it may be flushed beforehand. Nothing more is required.

Cleansing of the animal commode 10 may be accomplished with water and ordinary cleansing materials, perhaps using the same brush as normally used for a toilet bowl. The brush may be dipped into the water of the bowl through the large perforation 24 through which excrement escapes. If desired, a hose may be attached to a tee in the water line supplying the flush tank 26 with a spray nozzle permitted to hang until needed from a hook for this purpose suspended from the tank. Easy removal of the animal commode from the toilet bowl 23 through the hinging arrangement has already been mentioned. Some persons may desire to maintain a deodorant and disinfectant in the bowl or in the flush tank, of which numerous varieties are on the market.

The animal commode of the present invention is in a ready position for animal use at all times when not in use by a human. It may also be made available to the animal while its owner is away from home. It does not require special floor space, necessitate inconvenient or time-consuming cleaning methods, involve difficult disposal means, or occasion large continuing supply expense.

The animal commode 10 may be used in any size bathroom in its smaller sizes. Most bathroom layouts can accommodate the largest size.

I claim:

1. A toilet facility for use by both humans and animals, comprising:
   a human toilet facility having a seat provided with an opening therein; and
   an animal toilet facility having a supporting member including a top upon which an animal may rest and a bottom, said supporting member being provided with a perforation therein, means operatively mounting said supporting member to move between a first position in which said bottom of said supporting member rests upon said seat of said human toilet facility whereby said perforation of said supporting member of said animal toilet facility is located above said opening within said seat of said human toilet facility at which time said animal toilet facility may be used and a second position exposing said seat of said human toilet facility for use and a cover, means operatively connecting said cover to said supporting member of said animal toilet facility to move between a first position whereby said cover is positioned downwardly along the side of said human toilet facility as said bottom of said supporting member of said animal toilet facility rests upon said seat of said human toilet facility during use by animals and a second position whereby said cover closes the bottom of said supporting member of said animal toilet facility as said supporting member of said animal toilet facility is raised to said second position during use of said human toilet facility.

2. A toilet facility as in claim 1, wherein said supporting member of said animal toilet facility includes walls sloping from the outer portions thereof downwardly, certain of the other inwardly disposed portions of said walls intersecting said perforation.

3. A toilet facility as in claim 2, including a cup mounted on said bottom of said supporting member of said animal toilet facility, said cup positioned rearwardly of said perforation such that as said supporting member of said animal toilet facility is moved to said second position whereby said seat of said human toilet facility is exposed for use said cup is directly below said perforation of said supporting member of said animal toilet facility.

4. A toilet facility as in claim 3, wherein said top of said supporting member of said animal toilet facility further includes a rim formed along the circumference thereof and in the vicinity of the back thereof defining a container when said supporting member is raised to said second position.

5. A toilet facility as in claim 4, including a single hinge supporting both said seat of said human toilet facility and said supporting member of said animal toilet facility.

6. A toilet facility as in claim 4, including separate hinges supporting said seat of said human toilet facility and said supporting member of said animal toilet facility.

7. An animal commode to be combined with a conventional human toilet facility, comprising a supporting member upon which an animal may rest, said supporting member comprising walls sloping downwardly from the outer periphery thereof, portions of said walls intersecting in the vicinity of the mid-portion of said supporting member, at least one perforation provided in said supporting member in the vicinity of the intersection of said walls, a cup mounted to the underside of said supporting member and rearwardly of said perforation, a rim formed along the circumference of the upper side of said supporting member in the vicinity of said back thereof, a cover, means mounting said cover to said supporting member to move between a first position exposing the underside of said supporting member and means operatively mounting said supporting member to the conventional toilet facility.

* * * * *